United States Patent [19]
Chu et al.

[11] Patent Number: 4,882,305
[45] Date of Patent: Nov. 21, 1989

[54] DIELECTRIC CERAMIC COMPOSITION WITH HIGH DIELECTRIC CONSTANT AND FLAT TC CHARACTERISTICS

[75] Inventors: Mike S. H. Chu; Charles E. Hodgkins, both of Lewiston; Terence C. Dean, Youngstown, all of N.Y.

[73] Assignee: TAM Ceramics, Inc., Niagara Falls, N.Y.

[21] Appl. No.: 106,954

[22] Filed: Oct. 9, 1987

Related U.S. Application Data

[63] Continuation of Ser. No. 730,711, May 3, 1985, abandoned.

[51] Int. Cl.$^4$ .................... C04B 35/46; C04B 35/48; C04B 35/49
[52] U.S. Cl. .................... 501/138; 501/135; 501/136; 501/137; 501/139
[58] Field of Search .................. 501/135–139

[56] References Cited

U.S. PATENT DOCUMENTS 4,054,531 10/1977 Takahashi et al. .................. 501/137

FOREIGN PATENT DOCUMENTS

| 58-15078 | 1/1983 | Japan | 501/137 |
| 58-28103 | 2/1983 | Japan | 501/138 |
| 59-20905 | 2/1984 | Japan | 501/138 |
| 59-63605 | 4/1984 | Japan | 501/138 |
| 1527060 | 10/1978 | United Kingdom | 501/137 |

Primary Examiner—William R. Dixon Jr.
Assistant Examiner—Susan E. Hollenbeck
Attorney, Agent, or Firm—Kenyon & Kenyon

[57] ABSTRACT

The present invention provides ceramic compositions for preparing multi-layer capacitors (MLCs) having high dielectric constants between about 3000 and 4700 and stable temperature coefficients (TC) prepared from high purity barium titanate, niobium pentoxide and cobalt oxide.

6 Claims, No Drawings

DIELECTRIC CERAMIC COMPOSITION WITH HIGH DIELECTRIC CONSTANT AND FLAT TC CHARACTERISTICS

This application is a continuation of application Ser. No. 730,711, filed May 3, 1985, abandoned.

BACKGROUND OF THE INVENTION

This invention relates to ceramic dielectric compositions which have high dielectric constants (K), e.g., between about 3000 and about 4700; low dissipation factors (DF), e.g., below about 2.5%; high insulation resistance (R) capacitance (C) products (RC), e.g. above about 5,000 ohm-farad at 25° C., above about 1000 ohm-farad at 125° C.; and stable temperature coefficient (TC) in which the dielectric constant does not alter from its base value at 25° C. by more than about 15 percent over a temperature range from −55° C. to 125° C.

Multilayer ceramic capacitors (MLCs) are commonly made by casting or otherwise forming insulating layers of dielectric ceramic powder; placing thereupon conducting metal electrode layers, usually a palladium/silver alloy in the form of metallic paste; stacking the resulting elements to form the multilayer capacitor; and firing to densify the material thus forming a multilayer ceramic capacitor. Other processes for forming MLCs are described in U.S. Pat. Nos. 3,697,950 and 3,879,645 the texts of which are incorporated herein by reference.

Barium titanate ($BaTiO_3$) is one of the major components most frequently used in the formation of the ceramic dielectric layers because of its high dielectric constant. However, the variation of the dielectric constant with temperature and the insulation resistance are also important factors to be considered in preparing ceramic compositions for use in multilayer capacitors. The electrical properties of many dielectric ceramic compositions may vary substantially as the temperature increases or decreases. Other factors also affect the electrical properties of ceramic compositions, e.g., insulation resistance may vary substantially based on grain sizes after final sintering.

In a desirable dielectric ceramic composition for use in a multilayer capacitor for applications requiring stability in the dielectric constant over a wide temperature range, the dielectric constant does not change from its base value at 25° C. (room temperature) by more than about plus or minus 15 percent. The insulation resistance and capacitance product of such compositions should be more than 1000 ohm-farads at 25° C. and more than 100 ohm-farads at maximum working temperature, 125° C. in most cases. The method commonly used to produce such temperature stable capacitors consists of firing $BaTiO_3$ together with minor oxide additives for controlling the final dielectric properties. However, the dielectric ceramic compositions known in the art for making multilayer capacitors having stable TC characteristics usually have dielectric constants of not more than about 3000.

Because of their high dielectric constants, low dissipation factors, and stable TC characteristics, the ceramic compositions of this invention provide advantages in manufacturing multilayer ceramic capacitors, hereinafter called MLC's, such as high capacitance and small physical size. These advantages are very important for the capacitor manufacturing companies to meet the ever increasing demands of technology advance and cost reduction.

SUMMARY OF THE INVENTION

It is an object of the present invention to produce a ceramic composition having a dielectric constant between about 3000 and 4700 at 25° C., a dissipation factor less than about 3%, and a stable temperature coefficient in which the dielectric constant does not vary more than about plus or minus 15 percent from its reference value at 25° C.

It is another object of the present invention to produce a ceramic composition suitable for manufacturing multilayer ceramic capacitors using precious metal internal electrodes and having a dielectric constant between about 3000 and 4700 at 25° C., a dissipation factor of less than about 3%, and insulation resistance - capacitance product of more than about 5000 ohm-farad at 25° C. and more than about 1000 ohm-farad at 125° C., and also having a stable TC characteristic in which the dielectric constant does not vary more than about plus or minus 15 percent from its reference value at 25° C.

The above-stated objects are achieved by the present invention, which is directed to a dielectric composition having a high dielectric constant and stable TC characteristics comprising a major component comprising high purity barium titanate ($BaTiO_3$), and two minor components comprising niobium pentoxide ($Nb_2O_5$), and cobalt oxide ($CoO$). The barium titanate employed in this invention has purity exceeding about 99% with no individual impurity element greater than about 0.5%. Such high purity barium titanate can be produced via chemical coprecipitation processes and other techniques known in the art, e.g, by reacting high purity $BaCO_3$ and $TiO_2$ powders. The stoichiometry and the physical sizes of the barium titanate particles are controlled as hereinafter described to produce the desirable dielectric properties of the ceramic compositions of this invention. The preferred stoichiometric ratio for the barium titanate is $BaO/TiO_2$ of about 0.950 to 0.995 and the preferred average particle size is about 0.90 $\mu$m to 1.30 $\mu$m.

More specifically, in forming the dielectric ceramic composition of the invention, the major component ($BaTiO_3$) comprises from about 97.70 to about 98.99 percent by weight and the minor components comprise from about 0.85 to about 1.69 percent by weight of $Nb_2O_5$ and from about 0.09 to about 1.20 percent by weight of $CoO$, with the $Nb_2O_5$ to $CoO$ weight ratio from about 3.30 to about 18.00.

The ceramic compositions of this invention when formed into multilayer capacitors by conventional methods have dielectric constants which are typically between about 3000 and 4700 at 1 KHz, 1 VRMS, dissipation factors which are typically below about 3 percent at 1 VRMS, and insulation resistance - capacitance products which are typically greater than about 5,000 ohm-farad at 25° C., 50 VDC/mil, greater than 1000 ohm-farad at 125° C., and stable TC characteristics in which the dielectric constant varies no more than about plus or minus 15 percent from its reference value at 25° C.

In an especially preferred embodiment, the ceramic dielectric composition is formed from a mixture of 98.82 weight percent of high purity $BaTiO_3$, 0.98 weight percent of $Nb_2O_5$ and 0.20 weight percent of $CoO$, with the $Nb_2O_5$ to $CoO$ weight ratio being 4.90.

DETAILED DESCRIPTION OF THE INVENTION

As set forth below, the dielectric ceramic compositions of the present invention have several advantages which result in substantial technological advancement and cost savings without sacrificing desirable physical and electrical properties.

The present invention provides a novel dielectric ceramic composition having a dielectric constant between 3000 and 4700, and with stable TC characteristics which can be prepared by firing the component oxides or precursors thereof at a temperature between 1280° C. and 1350° C. This composition differs substantially from those disclosed in the prior art in which desirable dielectric properties, such as a higher dielectric constant, are sacrificed in order to obtain materials which have stable TC characteristics. Since conventional materials have dielectric constants not more than about 3000, the use of the ceramic compositions of this invention in multilayer capacitors provides smaller devices with significantly higher capacitance values under the same physical size restriction, due to their much higher dielectric constants. Also because of their much higher dielectric constants, the use of the ceramic compositions of this invention in multilayer capacitors provides the smallest possible physical size under the same capacitance restriction. Also because of their much higher dielectric constants, the use of the ceramic compositions of this invention in multilayer capacitors results in significantly less ceramic and electrode material usage. With the ever increasing cost of precious metals, especially palladium, the manufacturing cost of MLC's can be significantly reduced with the present invention.

A fired ceramic body of the present invention is produced by reacting during the course of firing the constituent dielectric oxides of the ceramic preparation, including barium titanates, niobium pentoxide and cobalt oxide.

The preferred niobium pentoxide for use in this invention is about 99% pure and has a particle size of about 0.5 to 0.9 μm and the preferred cobalt oxide is about 70–74% pure and has a particle size of less than about 1 μm.

In preparing the ceramic preparation used in this invention, barium titanate, niobium pentoxide, and cobalt oxide in the proportions set forth above may be slurried together in water, or physically blended together. The mixture of the ceramic preparation may be mixed with a binder composition and cast into a sheet using standard methods, and formed into a multilayer capacitor structure with internal electrodes such as 70 percent palladium/30 percent silver, and fired at about 1280° C. to 1350° C. for about two hours.

Any conventional ceramic binder compositions may be used with this invention which is compatible with the other materials used and simply provides a vehicle for dispersing the ceramic particles and holding them together when the solvent is removed. Suitable binder compositions are described in "Ceramic Process Before Firing," G. Y. Onoda Jr., et al. John Wiley & Sons (1978) Chap. 19. Corn Syrup and Polyvinyl alcohol are examples of suitable binder compositions.

The fired dielectric composition of this invention has an insulation resistance-capacitance product (RC) greater than 5,000 ohm-farads at 25° C. and 50 VDC/mil, and greater than 1000 ohm-farads at 125° C. and 50 VDC/mil. The dielectric constant is typically between about 3000 to 4700 at 1 KHz and 1 volt rms, and the dissipation factor is typically less than 3.0 percent at 1 KHz and 1 volt rms.

The invention will be further illustrated by the following examples, but the invention is not intended to be limited thereto. The values given for the examples herein are subject to variations based on factors known in the art. For example, with respect to Examples 1–35 herein, the dielectric constant may be significantly increased and the dissipation factor may be significantly decreased by pulverizing, milling, uniformly dispersing, or otherwise reducing the starting materials to very fine particles. Such practices, which are commonly carried out in the course of manufacturing ceramic capacitors, were not employed to their full extent in the preparation of Examples 1–35. In addition, variations in firing conditions, sample thickness and preparation, and measurement error may result in differences in the observed values for the same composition. Thus, depending upon manufacturing techniques, and with little regard to particle size, the properties of ceramic compositions made using the proportions given in Examples 1–35 can vary from values given: for example the dielectric constants may vary by ±100, the dissipation factor may vary by ±0.2 percent, and the capacitance change with temperature versus capacitance at 25° C. may vary by ±1.5 percent.

Details of preferred embodiments of the present invention are further described in the following examples.

EXAMPLES 1–11

30 to 50 grams of ceramic compositions were prepared by adding high purity barium titanate ($BaTiO_3$), technical grade fine particle size niobium pentoxide ($Nb_2O_5$), and technical grade fine particle size cobalt oxide (CoO) according to the weight percent as shown in Table 1. The barium titanate employed in the above examples has $BaO/TiO_2$ stoichiometry of 0.986 and average particle size of 1.2 μm. The ceramic powders were further blended with 15 to 25 cc of distilled water and mixed thoroughly in a high speed Spex model 800-2 paint mixer manufactured by Spex Industries Inc. New Jersey for about 10 minutes. The wet slurry was then dried into a cake and ground with mortar and pestle. 2.4 to 4.0 cc of a binder solution including 26 weight percent water, 26 weight percent propylene glycol and 48 weight percent corn syrup was mixed into the ceramic powder in a mortar and pestle which was then granulated through a 40 mesh nylon screen. Discs of the resultant mixture having a diameter of 1.27 cm and a thickness of 0.1 to 0.15 cm were pressed at a pressure of about 38,000 lbs per square inch in a stainless steel die. The discs were placed on a stabilized zirconia setter and fired at temperatures of 1280° C. to 1340° C. for 1 to 2 hrs. After cooling, silver electrodes were painted on the discs which were then fired at 815° C. to sinter on the electrodes. The capacitance (C), the dissipation factor (DF), and the capacitance change with temperature versus capacitance at 25° C. (TC) were then measured with a model ESI2110A capacitance bridge at 1 KHz measurement frequency, from −55° C. to +125° C. at about 20° C. intervals. The dielectric constant of each sample (K) was then calculated from the fundamental capacitance equation:

$$K = 5.66 \times C \frac{t}{D^2}$$

where
K = dielectric constant of the sample
t = thickness of the disc in inches
D = diameter of the disc in inches
C = capacitance of the disc in pico farads

TABLE I

| Example | Weight (%) BaTiO$_3$ | Nb$_2$O$_5$ | CoO | Ratio Nb$_2$O$_5$/CoO | Weight (%) Nb$_2$O$_5$ + CoO |
|---|---|---|---|---|---|
| 1 | 98.99 | 0.84 | 0.17 | 4.94 | 1.01 |
| 2 | 98.82 | 0.98 | 0.20 | 4.90 | 1.18 |
| 3 | 98.73 | 1.05 | 0.22 | 4.77 | 1.27 |
| 4 | 98.65 | 1.12 | 0.23 | 4.87 | 1.35 |
| 5 | 98.48 | 1.26 | 0.26 | 4.85 | 1.52 |
| 6 | 98.31 | 1.40 | 0.29 | 4.83 | 1.69 |
| 7 | 98.14 | 1.54 | 0.32 | 4.81 | 1.86 |
| 8 | 98.31 | 1.30 | 0.39 | 3.33 | 1.69 |
| 9 | 98.31 | 1.50 | 1.19 | 7.89 | 1.69 |
| 10 | 98.31 | 1.60 | 0.09 | 17.78 | 1.69 |
| 11 | 98.31 | 1.69 | 0.00 | >>>> | 1.69 |

The dielectric properties of Examples 1–11 as summarized in Table II demonstrate that, when Nb$_2$O$_5$ and CoO are added uniformly into the BaTiO$_3$ host material, ceramic compositions with dielectric constants greater than 3000 and with stable TC characteristics, such as Examples 2 to 10 are obtained. As will be demonstrated in later examples, both the dielectric constants and TC characteristics will be further improved when these ceramic compositions are cofired with silver/palladium internal electrodes in a MLC construction.

The dielectric data in Table II also shows that when the total Nb$_2$O$_5$ and CoO weight percent is less than about 1 wt.%, such as in Example 1, the ceramic composition has too negative a TC change at low temperatures and much higher DF although K is very high. When the Nb$_2$O$_5$ to CoO weight ratio is higher than 18.0, such as Example 11, TC becomes unstable and DF is high, although K is very high again.

TABLE II

| | 1 KHz, 1 VRMS | | TC (%) at | | | |
|---|---|---|---|---|---|---|
| Example | K | DF (%) | −55° C. | −30° C. | 85° C. | 125° C. |
| *1 | 4500 | 1.30 | −27.1 | −20.9 | −7.3 | +1.0 |
| 2 | 4030 | 0.93 | −12.3 | −7.5 | −6.1 | +6.6 |
| 3 | 3870 | 0.95 | −8.2 | −3.5 | −5.1 | +8.5 |
| 4 | 3765 | 0.85 | −2.2 | −0.5 | −3.4 | +11.1 |
| 5 | 3400 | 0.78 | 0.2 | −1.4 | −0.8 | +14.6 |
| 6 | 3200 | 0.70 | −2.6 | −3.1 | +0.8 | +15.3 |
| 7 | 3025 | 0.75 | −4.0 | −4.0 | +1.3 | +16.2 |
| 8 | 4034 | 1.20 | −22.5 | −16.4 | −13.7 | −16.0 |
| 9 | 3377 | 1.20 | −5.5 | −4.0 | −1.9 | +9.4 |
| 10 | 3905 | 1.10 | −23.2 | −12.9 | −11.0 | −11.5 |
| *11 | 5895 | 4.3 | −40.8 | −27.9 | −9.3 | −16.0 |

Examples which are outside the scope of this invention, such as 1 and 11, will be labeled with "*" hereafter.

EXAMPLES 12–18

30 to 50 grams of ceramic compositions were prepared by adding high purity barium titanate, technical grade fine particle size niobium pentoxide, and technical grade fine particle size cobalt oxide, according to the weight percentages as shown in Table III. Fine particle size, high purity titanium dioxide (TiO$_2$), or barium oxide (added as barium carbonate (BaCO$_3$)) were also added into the composition to adjust the BaO/TiO$_2$ stoichiometry. Ceramic disc samples were prepared, sintered, and dielectric properties measured with the same technique as described in Examples 1 to 11. The dielectric data as shown in Table IV demonstrate that when the BaO/TiO$_2$ stoichiometric ratio is greater than 0.993 such as in Examples 17 and 18, the resulting ceramics have low dielectric constants and very high dissipation factors and therefore are not suitable for MLC applications. Although not shown in the data provided in Table III, when the BaO/TiO$_2$ ratio is less than 0.958 as in Example 15 the TC at −55° C. tends to become much more negative. Past experience has also indicated that ceramic compositions with too large an excess TiO$_2$ have a tendency to develop nonuniform microstructures and poor reliability.

TABLE III

| Example | BaTiO$_3$ | Nb$_2$O$_5$ | CoO | BaO | TiO$_2$ | BaO/TiO$_2$ |
|---|---|---|---|---|---|---|
| 12 | 98.73 | 1.06 | 0.21 | 0 | 0 | 0.986 |
| 13 | 98.53 | 1.05 | 0.21 | 0 | 0.21 | 0.981 |
| 14 | 98.24 | 1.05 | 0.22 | 0 | 0.49 | 0.972 |
| 15 | 97.75 | 1.04 | 0.21 | 0 | 1.00 | 0.958 |
| 16 | 98.52 | 1.05 | 0.22 | 0.21 | 0 | 0.989 |
| *17 | 98.24 | 1.05 | 0.22 | 0.49 | 0 | 0.993 |
| *18 | 97.77 | 1.04 | 0.21 | 0.97 | 0 | 1.001 |

TABLE IV

| | | | [TC (%) at] | | | |
|---|---|---|---|---|---|---|
| Example | K | DF (%) | −55° C. | −30° C. | 85° C. | 125° C. |
| 12 | 3700 | 0.90 | −4.3 | −1.7 | −3.6 | +12.4 |
| 13 | 3800 | 0.97 | −9.5 | −3.5 | −6.5 | +6.9 |
| 14 | 3870 | 0.96 | −12.5 | −5.7 | −7.3 | +4.2 |
| 15 | 4010 | 0.93 | −13.8 | −7.1 | −8.3 | +2.2 |
| 16 | 3680 | 0.90 | −4.6 | −1.7 | −3.2 | +13.3 |
| *17 | 3590 | 1.50 | −8.2 | −4.3 | −5.4 | +9.2 |
| *18 | 3250 | 2.90 | −14.6 | −14.5 | −12.6 | +3.6 |

EXAMPLE 19–21

500 grams of high purity BaCO$_3$ and 202 grams of high purity TiO$_2$ are thoroughly mixed and dispersed in about 175 cc of deionized water until a uniformly dispersed slurry is obtained. Up to 4 weight percent "DARVAN C"1/ may be added into the slurry to help to disperse the powder particles. The slurry is then discharged into a drying pan and dried in an oven at about 150° C. with forced air circulation. The dried cake is then pulverized, loaded into a ceramic sagger, and calcined at temperature from about 1900° F. to about 2200° F. for about 1 hour to 5 hours. X-ray diffraction and BaO alkalinity tests on the examples indicated complete reaction and formation of high purity BaTiO$_3$. The calcined powder was then vibratory energy milled with ZrO$_2$ media until the average particle size was reduced to less than 1.2 μm. It will be obvious to those skilled in the art that particle size reduction can also be achieved by alternative methods, e.g., ball milling, and that the milling media can be any compatible wear resistant material such as ZrO$_2$, zircon, alumina, or the like. Another alternative method for reducing particle size is jet milling with compressed air without media. Whatever process might be selected, the critical requirement is that it does not contaminate the ceramic powder, e.g., with significant media wear. 30 to 50 grams of ceramic compositions according to the weight percents as shown in Table V are prepared and their dielectric properties measured with the same technique as described in Examples 1 to 11. The dielectric data as shown in Table VI demonstrates that the high purity BaTiO3 prepared in accordance with the present invention provides ceramic compositions with high dielectric constants and stable TC characteristics. The dielectric performance of these examples is similar to those as demonstrated in Examples 2 to 10.

[1] DARVAN C is a alkali ion free aqueous dispersing agent comprising a mixture of polyelectrolytes, ammonia and sulfur available from W. P. Vanderbilt Co., Conn.

TABLE V

| Ex- | Weight (%) | | | Ratio | Weight (%) |
|---|---|---|---|---|---|
| ample | $BaTiO_3$ | $Nb_2O_5$ | CoO | $Nb_2O_5$/CoO | $Nb_2O_5$ + CoO |
| 19 | 98.65 | 1.12 | 0.23 | 4.87 | 1.35 |
| 20 | 98.60 | 1.14 | 0.26 | 4.38 | 1.40 |
| 21 | 98.53 | 1.19 | 0.27 | 4.41 | 1.46 |

TABLE VI

| | | | TC (%) at | | | |
|---|---|---|---|---|---|---|
| Example | K | DF (%) | −55° C. | −30° C. | 85° C. | 125° C. |
| 19 | 3520 | 0.94 | −1.3 | −1.5 | −3.6 | +13.4 |
| 20 | 3700 | 1.18 | −20.2 | −13.9 | −13.0 | −2.9 |
| 21 | 3500 | 1.09 | −15.2 | −9.2 | −11.4 | +1.1 |

EXAMPLES 22–29

Batches of about 4.5 kilograms or about 270 kilograms of ceramic compositions were prepared for Examples 22–29 by blending and mixing high purity barium titanate, technical grade fine particle size cobalt oxide and niobium pentoxide in twin shell blenders, manufactured by Patterson Kelley Co., E. Stroudsburg, PA, according to the compositions shown in Table VII.

TABLE VII

| Ex-ample | $BaTiO_3$ | $Nb_2O_5$ | CoO | $Nb_2O_5$ + CoO | Weight (%) Electrode Material |
|---|---|---|---|---|---|
| 22 | 98.31 | 1.40 | 0.29 | 1.69 | 70Pd/30Ag |
| 23 | 98.61 | 1.15 | 0.24 | 1.39 | 70Pd/30Ag |
| 24 | 98.82 | 0.98 | 0.20 | 1.18 | 70Pd/30Ag |
| 25 | 98.72 | 1.06 | 0.22 | 1.28 | 70Pd/30Ag |
| 26 | 98.72 | 1.06 | 0.22 | 1.28 | 100Pd |
| 27 | 98.72 | 1.06 | 0.22 | 1.28 | 40Au/40Pt/20/Pd |
| 28 | 98.72 | 1.06 | 0.22 | 1.28 | 100Pt |
| 29 | 98.72 | 1.06 | 0.22 | 1.28 | No electrodes |

400 grams of the above uniformly blended ceramic compositions was then charged into a ball mill with ½ inch alumina media together with 218 grams of a binder solution made by uniformly mixing and dissolving 186 grams dioctylphthalate, 90 grams Nuostabe V-1444,[2]/ 597 ml ethanol, 270 ml toluene, and 372 grams Butvar B-763/ vinyl resin. Other compatible binders may be used such as those binders described in "Ceramic Processes Before Firing" Id.

[2] Nuostabe V-1444 is an alkali ion free organic solvent dispersing agent available from Nuodex Co. Inc., New Jersey.
[3] Butvar B-76 is a binder comprising a mixture of polyvinyl butyral, polyvinyl alcohol and polyvinyl acetate available from Monsanto Corp.

This slurry was milled for 16 hours, discharged, and filtered through a 44 micron screen. This slurry, having a viscosity of about 1500 to 3000 centipoise, was then de-aired and cast, in accordance with standard techniques, into a tape with a thickness of 1.5 mils. The tape was converted into multilayer ceramic capacitors having 70 percent Palladium/30 percent silver; 100 percent Palladium; 40 percent gold/40 percent platinum/20 percent palladium; or 100 percent platinum electrodes via conventional processes well known in the industry. Samples with no electrodes at all were also prepared for purposes of comparison. The capacitors were preheated to 260° C. for 48 hours, placed on stabilized zirconia setters and sintered at 1280° C. to 1350° C. for 2 hours. The sintered capacitors had 10 active dielectric layers with dielectric thickness ranging from 0.85 to 1.10 mil. Termination electrodes of DuPont Silver paint No. 4822, which is a mixture of silver and glass frit in a binder, were applied at opposite ends of the multilayer capacitor to connect alternate electrode layers and these capacitors were fired at 815° C. in a tunnel furnace, the dielectric constant (K), dissipation factor (DF), insulation resistance (R) and capacitance (C) product (RC) at 25° C., and 125° C., and capacitance change with temperature (TC) versus capacitance at 25° C. were measured with the same instruments described in Examples 1–11. The results are shown in Table VIII below. The measurements were again performed from −55° C. to 125° C. in 20° C. increments.

The dielectric properties of Examples 22–29 as summarized in Table VIII demonstrate that multilayer ceramic capacitors manufactured from ceramic compositions of this invention have high dielectric constants, greater than 3500 and up to 4800, low dissipation factor, less than 2%, very stable TC characteristics, and high insulation resistance-capacitance products, greater than 4000 at 25° C. and greater than 2000 at 125° C. The dielectric properties of these MLC's all meet and exceed the requirements listed in the EIA (Electronic Industries Association) specification for X7R ceramic multilayer capacitors. For X7R, such specification demands that the capacitors meet the requirement of dissipation factor less than 3%, RC product greater than 1000 at 25° C. and greater than 100° at 125° C., and TC within ±15% from −55° C. to 125° C.

Of particular importance to the ceramic compositions of this invention are the improved dielectric properties, particularly the dielectric constant and the TC at low temperatures which may be further improved when the ceramics are cofired with internal electrode materials in manufacturing the MLC's.

TABLE VIII

| Example | 22 | 23 | 24 | 25A | 25B |
|---|---|---|---|---|---|
| Electrode | 70Pd/30Ag | 70Pd/30Ag | 70Pd/30Ag | 70Pd/30Ag | |
| Dielectric Thickness (mils) | 0.90 | 1.00 | 0.85 | 1.0 | 4.1 |
| K at 25° C. | 3525 | 3840 | 4770 | 4190 | 4210 |
| DF at 25° C. (%) | 1.41 | 1.51 | 1.74 | 1.68 | 0.90 |
| TC at −55° C. (%) | +7.4 | +9.1 | −0.2 | +3.8 | −2.3 |
| −30° C. (%) | +2.6 | +6.4 | +2.2 | +5.5 | 0.34 |
| 85° C. (%) | −3.1 | −5.7 | −10.9 | −10.3 | −7.7 |
| 125° C. (%) | +5.9 | +2.0 | −7.8 | −6.7 | +4.2 |
| RC at 50 V/mil | | | | | |
| at 25° C. | 4130 | 5435 | 5135 | 6380 | 8645 |
| 125° C. | 3025 | 3025 | 3910 | 3480 | 4710 |

| Example | 26 | 27 | 28A | 28B | 29 |
|---|---|---|---|---|---|
| Electrode | 100Pd | 40Au/40Pt 120Pd | 100 Pt | | No Electrodes |
| Dielectric Thickness (mils) | 1.00 | 1.00 | 1.00 | 3.84 | 20 |
| K at 25° C. | 3750 | 4105 | 3410 | 3710 | 3660 |
| DF at 25° C. (%) | 1.48 | 1.60 | 1.80 | 1.13 | 0.74 |

TABLE VIII-continued

| TC at −55° C. (%) | +5.1 | +4.8 | +4.2 | −0.13 | −3.8 |
|---|---|---|---|---|---|
| −30° C. (%) | +4.5 | +3.3 | +2.0 | −0.05 | −0.4 |
| 85° C. (%) | −6.7 | −5.9 | −5.1 | −3.70 | −5.8 |
| 125° (%) | 4.9 | +6.7 | +7.6 | +11.2 | +8.4 |
| RC at 50 V/mil | | | | | |
| at 25° C. | 6500 | 5035 | 5180 | 7830 | — |
| 125° C. | 5000 | 3000 | 2300 | 4200 | — |

EXAMPLES 30-31

About 900 kilograms of ceramic composition were prepared by blending and mixing in the same manner as described in Examples 22-29 according to the compositions as shown in Table IX. Multilayer ceramic capacitors were made and their dielectric properties were measured in the same manner as described in Examples 22-29. The results as summarized in Table X demonstrate that multilayer capacitors made from ceramic compositions of these examples also have high dielectric constants, low dissipation factors, high insulation resistance, and stable TC characteristics meeting EIA's X7R specification.

TABLE IX

| Weight (%) Example | BaTiO$_3$ | Nb$_2$O$_5$ | CoO | Nb$_2$O$_5$ + CoO | Electrode Material |
|---|---|---|---|---|---|
| 30 | 98.56 | 1.17 | 0.27 | 1.42 | 70Pd/30Ag |
| 31 | 98.67 | 1.08 | 0.25 | 1.33 | 70Pd/30Ag |

TABLE X

| Example | 30 | 31 |
|---|---|---|
| Electrode | 70Pd/30Ag | 70Pd/30Ag |
| Dielectric Thickness (mils) | 0.98 | 1.30 |
| K at 25° C. | 4850 | 3831 |
| DF at 25° C. (%) | 2.24 | 2.15 |
| TC at −55° C. (%) | +6.5 | −3.3 |
| −30° C. (%) | +4.0 | +1.0 |
| 85° C. (%) | −7.0 | −12.2 |
| 125° C. (%) | +2.5 | −4.0 |
| RC at 50 V/mil | | |
| at 25° C. | 74700 | 6810 |
| 125° C. | 21370 | 5270 |

EXAMPLES 32-35

About 500 grams of the ceramic composition of Example 29 were added with about 350 cc of deionized water and about 5 grams of DARVAN C dispersing agent. Table XI shows the average particle size and the dielectric composition of Examples 32-35. The powder was then ball milled with zirconia milling media in a rubber lined milling jar for about 10 to 40 hours until the average particle sizes were 1.27, 1.20, 0.8, and 0.6 μm respectively. Subsequent chemical analysis indicate no impurity pick up from the zirconia media. Ceramic discs were prepared and their dielectric properties measured in the same manner as described in Examples 1 to 11. The data as shown in Table XII demonstrate that even with the same ceramic composition, the control of proper particle size distribution to obtain desirable electrical properties is important. When the average particle sizes are less than 0.8 μm, such as in Examples 34 and 35, the TC at both the cold and hot temperature side are much too negative, and the dissipation factors are very high, although the dielectric constant is very high. These ceramic compositions are outside the scope of this invention. Based on previous art and experience compositions with average particle sizes larger than 1.30 μm, are also not desirable because such compositions are usually difficult to sinter to full density which causes lower dielectric constants and higher dissipation factors.

TABLE XI

| Weight (%) Example | Average Particle Size (μm) | BaTiO$_3$ | Nb$_2$O$_5$ | CoO |
|---|---|---|---|---|
| 32 | 1.27 | 98.56 | 1.17 | 0.27 |
| 33 | 1.20 | 98.56 | 1.17 | 0.27 |
| *34 | 0.80 | 98.56 | 1.17 | 0.27 |
| *35 | 0.60 | 98.56 | 1.17 | 0.27 |

TABLE XII

| TC (%) Example | K | DF(%) | TC (%) at −55° C. | −30° C. | 85° C. | 125° C. |
|---|---|---|---|---|---|---|
| 32 | 3500 | 1.13 | −4.0 | −3.5 | −3.5 | +17.4 |
| 33 | 3730 | 0.95 | −8.3 | −3.4 | −8.2 | +8.6 |
| *34 | 4570 | 1.52 | −30.3 | −22.6 | −18.3 | −19.1 |
| *35 | 4500 | 1.70 | −34.5 | −24.9 | −11.3 | −22.1 |

What is claimed is:

1. A ceramic composition having a dielectric constant between about 3,000 and 4,700 at 25° C. consisting of
   about 97.7-98.99% wt barium titanate;
   about 0.85-1.69% wt of niobium pentoxide;
   about 0.09-1.20% of cobalt oxide;
   about a wt ratio of niobium pentoxide to cobalt oxide of about 3.30 to 18.00 and wherein
   the barium titanate has a purity of about 99.0%, a BaO/TiO$_2$ stoichiometric ratio of about 0.950 to 0.995; and an average particle size of about 0.90 μm to 1.30 μm;
   the niobium pentoxide has a purity of about 99.0% and a particle size of about 0.5 to 0.9 μm; and
   the cobalt oxide has a purity of about 70% to 74% and a particle size of less than about 1.0 μm.

2. The ceramic composition of claim 1 wherein:
   the barium titanate is about 98.82% wt;
   the niobium pentoxide is about 0.98% wt;
   the cobalt oxide is about 0.20% wt; and
   the niobium pentoxide to cobalt oxide weight ratio is about 4.90.

3. A ceramic composition useful for making MLCs having high dielectric constants and TC characteristics that vary no more than about ±15 percent from their reference value at 25° C. over a temperature range of −55° C. to 125° C., the composition consisting a mixture of:
   about 97.70 -98.99 % wt barium titanate;
   about 0.85 -1.69 % wt of niobium pentoxide;
   about 0.09 -1.20 % wt of cobalt oxide;
   having a weight ratio of niobium pentoxide to cobalt oxide of about 3.30 to 18.00; and
   the mixture dispersed in a binder composition.

4. The ceramic composition of claim 3, wherein: the barium titanate has a purity greater than about 99.0%, the BaO/TiO$_2$ stoichiometric ratio is about 0.950 to 0.995, and an average particle size is about 0.90μm to 1.30μm.

5. The ceramic composition of claim 4 wherein:
   the niobium pentoxide has a purity of about 99.0% and a particle size of about 0.5 to 0.9μm; and
   the cobalt oxide has a purity of about 70% to 74% and a particle size of less than about 1.0 μm.

6. The ceramic composition of claim 3, wherein:
   the barium titanate is about 98.82% wt;
   the niobium pentoxide is about 0.98% wt;
   the cobalt oxide is about 0.20% wt; and
   the niobium pentoxide to cobalt oxide weight ratio is about 4.90.

* * * * *